(12) United States Patent
Mahadevan et al.

(10) Patent No.: US 8,582,660 B2
(45) Date of Patent: Nov. 12, 2013

(54) SELECTIVE VIDEO FRAME RATE UPCONVERSION

(75) Inventors: Vijay Mahadevan, San Diego, CA (US); Brijesh Pillai, San Diego, CA (US); Khaled Helmi El-Maleh, San Diego, CA (US); Fang Shi, San Diego, CA (US); Vijayalakshmi R. Raveendran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1873 days.

(21) Appl. No.: 11/468,041

(22) Filed: Aug. 29, 2006

(65) Prior Publication Data
US 2007/0242748 A1 Oct. 18, 2007

Related U.S. Application Data

(60) Provisional application No. 60/792,147, filed on Apr. 13, 2006.

(51) Int. Cl.
*H04N 7/12* (2006.01)

(52) U.S. Cl.
USPC ................................... 375/240.25

(58) Field of Classification Search
USPC .............. 375/240, 240.01, 240.05, 240.16, 375/240.25; 353/30
See application file for complete search history.

(56) References Cited

U.S. PATENT DOCUMENTS

| | | | |
|---|---|---|---|
| 5,459,517 A | | 10/1995 | Kunitake et al. |
| 6,094,455 A | * | 7/2000 | Katta ....................... 375/240.05 |
| 6,192,080 B1 | * | 2/2001 | Sun et al. ................. 375/240.16 |
| 7,461,939 B2 | * | 12/2008 | Allen et al. ...................... 353/30 |
| 2004/0101058 A1 | | 5/2004 | Sasai et al. |

FOREIGN PATENT DOCUMENTS

| | | |
|---|---|---|
| JP | 3036287 | 4/2000 |
| JP | 2005006275 A | 1/2005 |
| JP | 2005318611 A | 11/2005 |
| JP | 2006504175 A | 2/2006 |
| WO | 9631069 | 10/1996 |
| WO | 0101696 | 1/2001 |
| WO | 2004039074 | 5/2004 |
| WO | WO2006007527 | 1/2006 |

OTHER PUBLICATIONS

Zhang, et al.: "Using Scene-Change Detection and Multiple-Thread Background Memory for Efficient Video Coding," Electronic Letters, vol. 35, Issue 4, XP006011823, ISSN: 0013-5194, pp. 290-291, Feb. 18, 1999.
International Search Report—PCT/US2007/066609, International Searching Authority—European Patent Office—Nov. 6, 2008.
Written Opinion—PCT/US2007/066609, International Searching Authority—European Patent Office—Nov. 6, 2008.

(Continued)

*Primary Examiner* — Allen Wong
(74) *Attorney, Agent, or Firm* — Kenyon S. Jenckes; Elaine H. Lo

(57) ABSTRACT

This disclosure is directed to techniques for selective video frame rate upconversion (FRUC) in a video decoder. A video decoder selectively enables or disables FRUC based on one or more adaptive criteria. The adaptive criteria may be selected to indicate whether FRUC is likely to introduce spatial artifacts. Adaptive criteria may include a motion activity threshold, a mode decision threshold, or both. The criteria are adaptive, rather than fixed. When the criteria indicate that a frame includes excessive motion or new content, the decoder disables FRUC.

45 Claims, 10 Drawing Sheets

(56) References Cited

OTHER PUBLICATIONS

International Preliminary Report on Patentability—PCT/US2007/066609, International Bureau of WIPO—Geneva, Switzerland—Nov. 27, 2008.

Tien-Ying Kuo et al: "Motion-compensated frame interpolation scheme for H.263 codec", Circuits and Systems, Proceedings of the 1999 IEEE International Symposium on Orlando. FL, vol. 4. May 30, 1999, pp. 491-494.

Haavisto P. et al: "Motion Adaptive Scan Rate Up-Conversion", Multidimensional Systems and Signal Processing, vol. 3, Jan. 1, 1992, pp. 113-130.

Sasai, H. et al.: "Frame Rate Up-Conversion Using Reliable Analysis of Transmitted Motion Information", IEEE ICASSP, pp. 257-260, 2004.

Teh-Tzong Chao et al: "Motion-Compensated Spatio-Temporal Interpolation for Frame Rate Up-Conversion of Interlaced or Progressive Image Sequence", Proceedings of the SPIE, Bellingham, VA, vol. 2308, Sep. 25, 1994, pp. 682-693.

Sung-Hee Lee et al: "Adaptive motion-compensated interpolation for frame rate up-conversion" IEEE Transactions on Consumer Electronics, vol. 48, No. 3, Aug. 2002, pp. 444-450.

Bagni, D., et al: "Motion Compensated Post-Processing for Low Bit Rate Videoconferencing on ISDN Lines", IEEE ICCE, pp. 28-29, 1997.

Tourapis, A.M. et al: "Temporal Interpolation of Video Sequences Using Zonal Based Algorithms", IEEE ICIP, pp. 895-898, 2001.

Zhai, J. et al.: "A Low Complexity Motion Compensated Frame Interpolation Method", IEEE ISCAS, pp. 4927-4930, 2005.

Castagno, R. et al: "A method for motion adaptive frame rate up-conversion", IEEE Transactions on Circuits and Systems for Video Technology, vol. 6, No. 5, pp. 436-446, Oct. 1996.

Dane, G. et al: "Motion vector processing for frame rate up conversion", IEEE ICASSP, pp. 309-312, 2004.

Partial International Search Report, PCT/US2007/066609—International Searching Authority—European Patent Office—Aug. 5, 2008.

* cited by examiner

SELECTIVE VIDEO FRAME RATE UPCONVERSION

This application claims the benefit of U.S. Provisional Application No. 60/792,147, filed Apr. 13, 2006, the entire content of which is incorporated herein by reference.

TECHNICAL FIELD

The invention relates to digital video encoding and decoding and, more particularly, techniques for video frame rate upconversion.

BACKGROUND

A number of different video encoding standards have been established for encoding digital video sequences. The Moving Picture Experts Group (MPEG), for example, has developed a number of standards including MPEG-1, MPEG-2 and MPEG-4. Other examples include the International Telecommunication Union (ITU)-T H.263 standard, and the emerging ITU-T H.264 standard and its counterpart, ISO/IEC MPEG-4, Part 10, i.e., Advanced Video Coding (AVC). These video encoding standards support improved transmission efficiency of video sequences by encoding data in a compressed manner.

Compression reduces the overall amount of data that needs to be transmitted. Typical digital video encoding techniques utilize similarities between successive video frames, referred to as temporal or Inter-frame correlation, to provide Inter-frame compression. The Inter-frame compression techniques exploit data redundancy across frames by converting pixel-based representations of video frames to motion representations. Frames encoded using Inter-frame techniques are referred to as P ("predictive") frames or B ("bi-directional") frames. Other frames are Intra-coded using spatial compression.

To meet low bandwidth requirements, some video applications encode video at a reduced frame rate using frame skipping. Unfortunately, low frame rate video can produce artifacts in the form of motion jerkiness. Frame interpolation or extrapolation may be employed at the decoder side to approximate the content of skipped frames and, in effect, upconvert the actual frame rate to provide a perception of smoother motion. Frame interpolation or extrapolation may be used to support frame rate up conversion (FRUC). Although FRUC may enhance temporal quality by interpolating or extrapolating skipped frames, interpolation or extrapolation of some frames may also introduce undesirable spatial artifacts that undermine visual quality of the video sequence.

SUMMARY

This disclosure is directed to techniques for selectively enabling and disabling FRUC in a video decoder. According to this disclosure, a video decoder selectively enables and disables FRUC based on one or more adaptive criteria. The adaptive criteria may be selected to indicate whether interpolation or extrapolation of a particular frame is likely to introduce significant spatial artifacts. The frame interpolation or extrapolation techniques may be used as part of a FRUC scheme to enhance temporal quality of the video sequence. When FRUC is disabled, the decoder may apply frame repetition, i.e., repetition of a previous frame in place of a skipped frame.

The adaptive criteria for selective enablement of FRUC may include a motion activity threshold, a mode decision threshold, or both. In each case, the pertinent criteria are adaptive, rather than fixed. In particular, the criteria may be adaptive to the content of one or more frames in the proximity of a skipped frame. When the criteria indicate that the content of a previous frame includes excessive motion or new content, the video decoder temporarily disables FRUC. Hence, based on adaptive criteria, a video decoder selects either FRUC or frame repetition.

In one embodiment, the disclosure provides a method comprising selectively enabling and disabling video frame rate upconversion in a video decoder based on one or more criteria, and adapting the criteria based on one or more characteristics of at least one previous video frame in proximity to a skipped frame.

In another embodiment, the disclosure provides a video decoder comprising a frame rate upconversion module, and a control module that selectively enables and disables the frame rate upconversion module based on one or more criteria, and adapts the criteria based on one or more characteristics of at least one previous video frame in proximity to a skipped frame.

The techniques described in this disclosure may be implemented in a hardware, software, firmware, or any combination thereof. If implemented in software, the software may be executed in a processor, such as a digital signal processor (DSP). The software that executes the techniques may be initially stored in a computer readable medium and loaded and executed in the processor. Accordingly, this disclosure also contemplates a computer readable medium comprising instructions to cause a processor to perform techniques for adaptive video frame interpolation.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
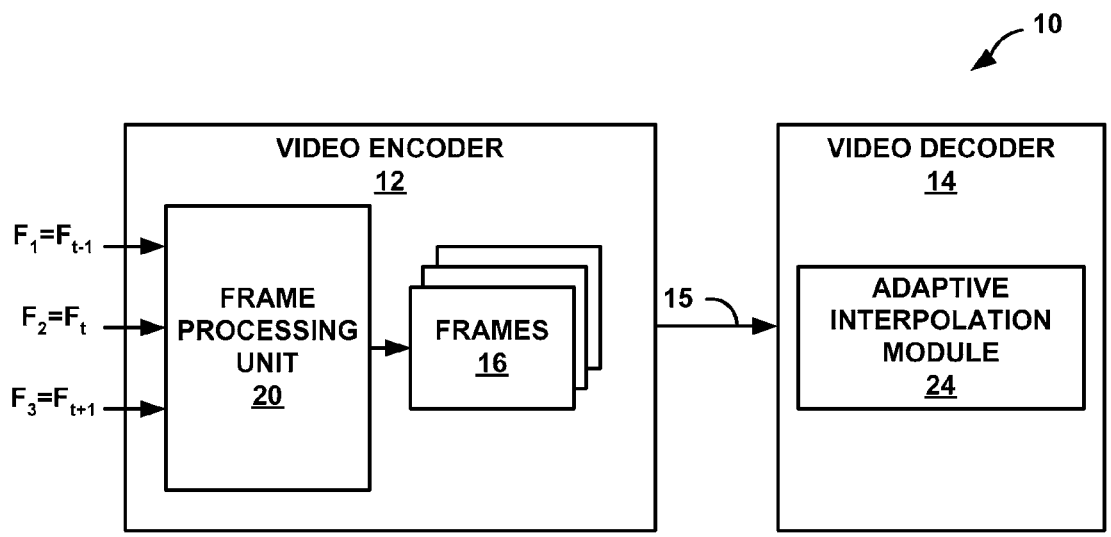
FIG. 1 is a block diagram illustrating a video encoding and decoding system configured to employ a selective FRUC technique in accordance with this disclosure.

FIG. 1 is a block diagram illustrating a video encoding and decoding system 10 configured to employ a selective FRUC technique in which FRUC is selectively enabled or disabled based on one or more adaptive criteria. As shown in FIG. 1, system 10 includes a video encoder 12 and a video decoder 14 connected by a transmission channel 15. Transmission channel 15 may be a wired or wireless medium capable of conveying frames within a bitstream. Channel 15 may support bi-directional or uni-directional video transmission.

System 10 may be configured for video telephony, video streaming or video broadcasting. Accordingly, reciprocal encoding, decoding, multiplexing (MUX) and demultiplexing (DEMUX) components may be provided on opposite ends of channel 15. In some embodiments, encoder 12 and decoder 14 may be embodied within video communication devices such as wireless mobile terminals equipped for video streaming, video broadcast reception, and/or video telephony, such as so-called wireless video phones or camera phones.

System 10 may support video telephony according to the Session Initiated Protocol (SIP), ITU-T H.323 standard, ITU-T H.324 standard, or other standards. Video encoder 12 generates encoded video data according to a video compression standard, such as MPEG-2, MPEG-4, ITU-T H.263, ITU-T H.264, or MPEG-4, Part 10. Although not shown in FIG. 1, video encoder 12 and video decoder 14 may be integrated with an audio encoder and decoder, respectively, and include appropriate hardware and software components to handle both audio and video portions of a data stream.

Encoder 12 encodes video frames 16, which may include Intra frames (I frames), predictive frames (P frames), and bi-directional predictive frames (B frames). I frames are frames that completely encode all video information using spatial coding techniques. The encoded frames may comprise information describing a series of video blocks that form a frame. The video blocks, sometimes referred to as macroblocks (MBs), include coding bits that define pixel values, e.g., in luminance (Y), chrominance red (Cr) and chrominance blue (Cb) color channels.

Encoder 12 may implement frame skipping to reduce the frame rate of data transmitted over transmission channel 15. In particular, encoder 12 may be configured to intentionally skip selected frames, e.g., by not coding selected frames or not transmitting selected coded frames. Frame skipping permits encoder 12 to conform to a reduced transmission rate requirement of channel 15. Frames may be skipped at a fixed rate such that skipping occurs at alternating frames or at every nth frame. Alternatively, frames may be skipped at a varying rate, e.g., based on intelligent frame skipping criteria. In either case, to increase the effective frame rate, and thereby improve temporal quality, decoder 14 performs a FRUC process to approximate at least some of the skipped frames using either video frame interpolation or extrapolation. Although a FRUC process may employ video frame extrapolation, video frame interpolation will be generally described in this disclosure for purposes of illustration.

FRUC may be used by decoder 14 to replace frames that are skipped. In addition, in some implementations, FRUC may be used for frames dropped or lost during transmission. Frames skipped by encoder 12 and frames dropped or lost during transmission will generally be referred to as skipped frames in this disclosure. Although a FRUC process may enhance temporal quality by interpolating or extrapolating skipped frames, such techniques may introduce undesirable spatial artifacts that undermine subjective visual quality of the video sequence. Decoder 14, in accordance with this disclosure, applies a technique for selective application of FRUC to skipped video frames. According to this disclosure, decoder 14 selectively enables and disables FRUC based on one or more adaptive criteria that indicate whether FRUC is likely to introduce significant spatial artifacts.

In general, adaptive criteria applied by decoder 14 for selective enablement and disablement of FRUC may include a motion activity threshold, a mode decision threshold, or both. In each case, the pertinent criteria are adaptive and adapt to the content of one or more frames in the proximity of a skipped frame, e.g., in the proximity of a frame to be interpolated. For example, when the criteria indicate that the content of a previous frame includes excessive motion or new content, decoder 14 temporarily disables FRUC. When the criteria indicate less motion activity, decoder 14 enables FRUC.

When FRUC is disabled, decoder 14 activates frame repetition, i.e., repetition of a previous frame in place of the skipped frame. In this case, decoder 14 avoids undesirable spatial artifacts that could be introduced by FRUC, e.g., due to interpolation. However, frame repetition reduces the perceived temporal quality of the video. Hence, the adaptive criteria permit decoder 14 to balance temporal quality versus spatial quality by selectively applying either frame interpolation (or extrapolation) or frame repetition.

In the example of FIG. 1, video encoder 12 includes a frame processing unit 20 configured to process incoming frames $F_1$, $F_2$, $F_3$ of video information. Frame processing unit 20 encodes incoming frames $F_1$ and $F_3$ as one of the above described I, P, or B frames 16. $F_2$ represents a frame to be skipped. Video encoder 12 transmits frames 16, which includes processed frames $F_1$ and $F_3$, but not skipped frame $F_2$, to video decoder 14 via transmission channel 15. Typically, encoder 12 transmits these frames in a pre-defined sequence, such as IBBPBBPBBPBBI, where I, B, and P refer to I frames, B frames, and P frames, respectively.

Frames $F_1$, $F_2$, $F_3$ represent three frames in a video sequence containing many frames, and are used to describe the interpolation of a skipped frame $F_2$ that resides between two transmitted frames ($F_1$, $F_2$, $F_3$). In some embodiments, multiple frames may be skipped, in which case more than one frame residing between two transmitted frames may require interpolation. For ease of illustration, this disclosure will refer to the example case in which a single frame $F_2$ is skipped and selectively interpolated.

Video decoder 14 receives the sequentially transmitted frames 16 via transmission channel 15. Video decoder 14 may apply standard decoding techniques to decode each of the received frames 16 ($F_1$ and $F_3$), e.g., according to one of the MPEG-1, MPEG-2, MPEG-4, H.263, H.264, MPEG-4, Part 10 standards. In accordance with this disclosure, decoder 14 further includes selective FRUC module 24, which it applies to frames 16 in order to selectively interpolate skipped frame $F_2$. Again, although a FRUC process may employ frame extrapolation, frame interpolation will be described in this disclosure for purposes of example.

Selective FRUC module 24 receives successive frames in the video sequence. For each skipped frame ($F_2$) to be interpolated, there is a previous frame ($F_1$) and a current frame ($F_3$). The frame to be interpolated resides between the previous and current frames. Interpolation may be performed by any of a variety of techniques, such as motion-compensated interpolation (MCI), linear interpolation, bilinear interpolation, bicubic interpolation, spline interpolation, nearest neighbor interpolation, or the like. Selective FRUC module 24 determines whether the received frames indicate an excessive amount of motion or new content using adaptive criteria, such as an adaptive motion activity threshold, an adaptive mode decision threshold, or both.

If a previous frame $F_1$ and current frame $F_3$ indicate excessive motion or new content, the skipped frame $F_2$ is considered a poor candidate for interpolation. In particular, excessive motion activity or new content indicates a substantial likelihood that interpolation will produce undesirable spatial artifacts. The likely production of undesirable spatial artifacts may be referred to as FRUC failure in the sense that application of interpolation for FRUC would produce an undesirable result. Hence, selective FRUC module 24 relies on a FRUC failure prediction (FFP) in determining whether to enable or disable interpolation.

Selective FRUC module 24 predicts FRUC failure based on a motion activity threshold, a mode decision threshold, or both. Notably, such thresholds are not fixed. Instead, the thresholds are dynamically adapted to video frame content over the course of a frame sequence. When FRUC failure is predicted, based on information from a previous frame, selective FRUC module 24 disables interpolation. When interpolation is disabled, decoder 14 may simply repeat the previous frame, instead of interpolating a frame between the previous frame and the current frame. In this case, decoder 14 uses a duplicate version of the previous frame in place of the skipped frame.

Selective FRUC reduces the likelihood that an interpolated frame will produce noticeable spatial artifacts. Conversely, selective FRUC avoids repetition of a previous frame when interpolation of a skipped frame is likely to produce acceptable visual results. Thus, unlike techniques that rely on fixed thresholds based on arbitrary or empirical determinations, the techniques described in this disclosure provide a robust and content-based, selective technique by which decoder 14 may repeat those frames that have a high likelihood of spatial artifacts when interpolated.

Figure 2:
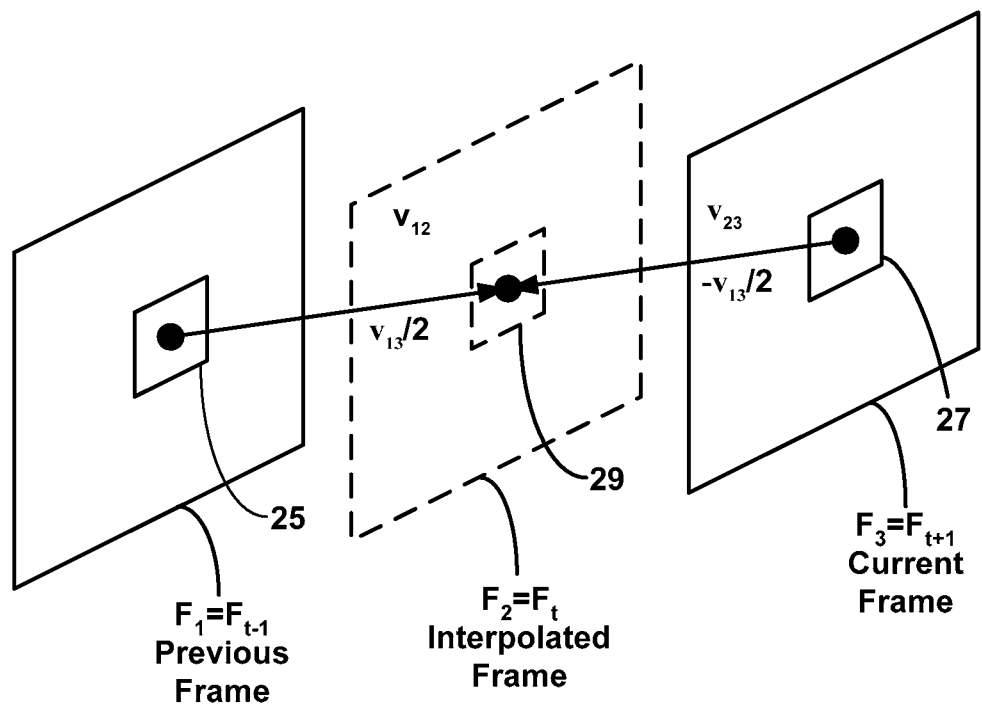
FIG. 2 is a diagram illustrating an example of a simple technique for interpolation of a skipped frame to support a FRUC technique in a video decoder.

FIG. 2 is a diagram illustrating an example of a simple technique for interpolation of a skipped frame to support a FRUC technique in video decoder 14. In general, to interpolate an MB in a skipped frame F2 between a previous frame F1 and a current frame F3, video decoder 14 may rely on a vector $v_{13}$ extending between an MB 25 in frame F1 and a corresponding block 27 in frame $F_3$. Frames $F_1$ and $F_3$ are frames that temporally precede (t−1) and follow (t+1), respectively, the skipped frame $F_2$ that requires interpolation. The vector $v_{13}$ is generally divided by two (for 1:2 frame rate conversion) to produce motion vectors $v_{13}/2$ and $-v_{13}/2$ and identify a corresponding MB 29 in the skipped frame $F_2$. For 1:N conversion, the motion vectors would be scaled accordingly.

Figure 3:
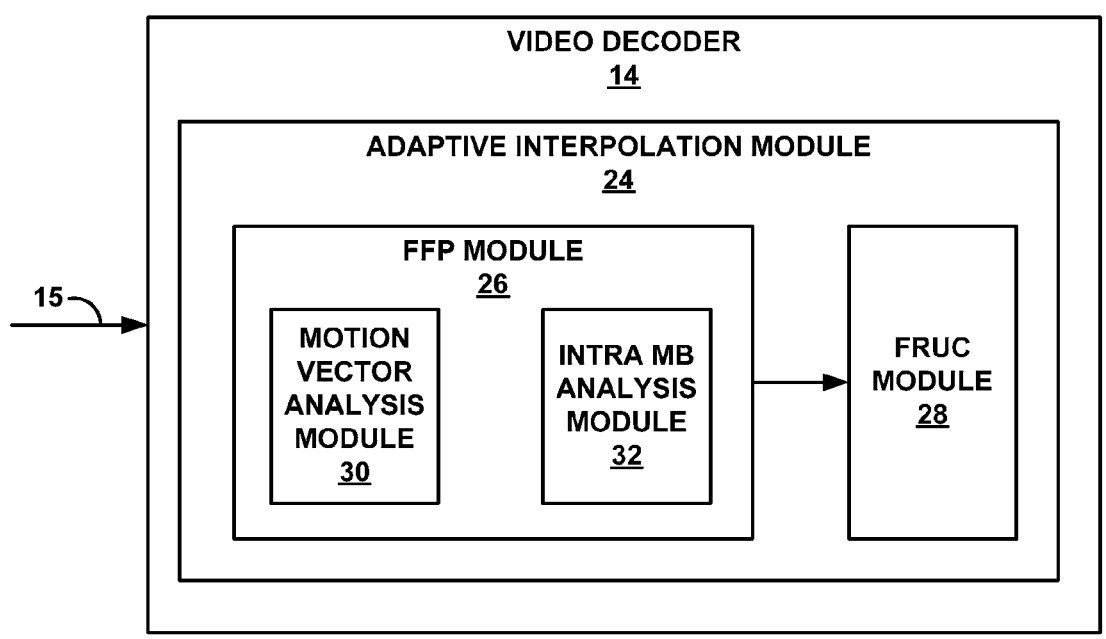
FIG. 3 is a block diagram illustrating the video decoder of FIG. 1 in more detail.

FIG. 3 is a block diagram illustrating video decoder 14 of FIG. 1 in more detail. As shown in FIG. 3, video decoder 14 includes selective FRUC module 24. Selective FRUC module 24 includes a FRUC failure prediction (FFP) module 26 and a FRUC module 28. In the example of FIG. 2, FFP module 26 forms a control module for FRUC module 28, and includes motion activity analysis module 30 and Intra-macroblock (MB) analysis module 32. In other embodiments, FFP module 26 may include motion activity analysis module 30 alone, Intra-MB analysis module 32 alone, or both motion activity analysis module 30 and intra-MB analysis module 32.

Motion activity analysis module 30 analyzes motion activity information for the current frame $F_3$ and a previous frame $F_1$ to determine whether a skipped frame $F_2$ between the previous frame and the current frame should be interpolated. Intra MB analysis module 32 analyzes Intra-coded MB bits in the current frame relative to a mode decision threshold to determine whether the skipped frame should be interpolated. FFP module 26 may utilize motion activity analysis module 30 and intra-MB analysis module 32 independently or in combination to identify frames that should be repeated instead of reproduced using a FRUC process, e.g., by interpolation or extrapolation. FRUC module 28 may apply a conventional interpolation technique to support a FRUC process, subject to selective enablement or disablement in response to FFP module 26, which functions as a control module for the FRUC module.

FFP module 26 employs motion activity analysis module 30 to adaptively determine a motion activity threshold indicative of excessive motion or new content. New content may refer to a new object that quickly enters or leaves a video scene over a series of video frames. Motion activity analysis module 30 receives and analyzes a previous video frame in a sequence of frames, and generates a motion activity value. In some embodiments, the motion activity value may be a motion vector value obtained from a motion vector histogram. The previous video frame may be a frame that immediately precedes the skipped frame, or one or more prior frames in the proximity of the skipped frame. The motion vector histogram indicates the distribution of motion vectors among the MB's in the previous video frame, and may be used to characterize the motion activity of the content in the previous video frame, e.g., in terms of an average or mean motion vector value across all MB's in the frame.

Using the motion vector histogram for the previous frame, or the nearest past frame for which motion vectors are available, motion activity analysis module 30 adaptively adjusts a motion activity threshold. The motion activity threshold can be selected from the entire range of the histogram. For example, motion activity analysis module 30 may establish the motion activity threshold as a sum of an average or mean motion vector for the previous frame and a difference value. In this way, the motion activity threshold is adaptively updated as each new frame is received. In particular, as motion activity analysis module 30 receives additional frames in a video sequence, it receives a new "previous" frame and updates the motion activity threshold based on the average motion vector for that frame. Hence, as the video sequence progresses, interpolation of a skipped frame is a function of new previous and current frames associated with the skipped frame.

Motion activity analysis module 30 generally requires that the previous frame include information describing a plurality of video blocks, which may be referred to as macroblocks (MBs), where each MB contains motion vector information. Accordingly, motion activity analysis module 30 typically may be used for P frames of a video sequence. P frames generally contain a predominance of inter-coded MBs, with associated motion vectors. From the available motion vector information, motion activity analysis module 30 computes the motion vector histogram. In this example, based on the motion vector histogram, motion activity analysis module 30 adaptively determines the motion activity threshold.

Motion activity analysis module 30 compares the motion vector information for a current video frame to the motion activity threshold adjusted based on the current "previous" frame to determine whether FRUC should be enabled and, hence, whether a frame should be interpolated. If motion activity information, e.g., average motion vector, for the current frame exceeds the motion activity threshold, indicating excessive motion or new content, FFP module 26 disables interpolation by FRUC module 28. In this case, decoder 14 repeats the previous frame. Alternatively, if the motion activity information does not exceed the motion activity threshold, FFP module 26 enables FRUC module 28 to apply interpolation.

In some embodiments, motion activity analysis module 30 may operate to analyze motion vector information in both an X (horizontal) direction and a Y (vertical) direction of a video frame. If the average motion vector value in the X direction of the current frame exceeds an adaptive motion activity threshold for the X direction, FFP module 26 disables interpolation. Likewise, FFP module 26 disables interpolation if the average motion vector value in the Y direction of the current frame exceeds an adaptive motion activity threshold for the Y direction. As an alternative, angle information may be used to evaluate both vector magnitude and direction. More advanced adaptive threshold strategies can also be used. For example, sliding MB windows may be used to formulate the motion vector histogram.

Alternatively, or additionally, FFP module 26 may employ Intra MB analysis module 32 to adaptively determine whether a frame should be interpolated. Intra MB analysis module 32 uses mode decision information of the current frame. Intra MBs are used when motion estimation fails or when it is more economical (i.e., less coding bits) to Intra code an MB, rather than Inter code the MB. In both cases, it is reasonable to assume that the presence of Intra MBs in a frame is an indication of significant new content or motion. In general, intra MB analysis module 28 compares the number of Intra MBs in a current frame to an adaptive mode decision threshold to determine if the skipped frame should be interpolated. The mode decision threshold can be determined using either or both of two different techniques, as will be described.

According to one technique, Intra MB analysis module 32 adaptively adjusts the mode decision threshold according to the Intra MB count in the current frame at the bitstream level. In particular, Intra MB analysis module 32 receives and analyzes the previous frame of a sequence of frames in order to count the MBs in the previous frame having a number of MB bits above one standard deviation from a mean value for that frame. If an MB has a number of MB bits above one standard deviation, compared to other MBs, Intra-coding of the MB or high motion can be inferred. The number of Intra-coded MBs in the previous frame generally indicates the degree of motion or change in the previous frame. Also, a high number of MB bits signifies a region of greater change from a previous frame.

From this MB information, intra MB analysis module 32 adaptively determines a mode decision threshold. In particular, Intra MB analysis module 32 may establish the mode decision threshold as a sum of the number of MBs counted as Intra MBs in the previous frame and a difference value. If the number of Intra MBs in the current frame is higher than the mode decision threshold, then there has been substantial motion or change between the previous frame and the current frame. In this case, FFP module 26 disables FRUC module 28, and video decoder 14 repeats the previous frame instead of interpolating the skipped frame. Notably, analysis of Intra MB bits permits the mode decision threshold to be obtained using bitstream level information.

Alternatively, or additionally, Intra MB analysis module 32 may use a mode decision threshold for the Intra MB count by estimating an approximate contiguous object size in the previous frame. This approach relies on intensity information of the previously decoded frame, and predicts the size of a dominant object within that frame. Hence, the mode decision threshold may be based on a contiguous object size in a frame, a number of Intra MBs in the frame, or both. Using intensity information, Intra MB analysis module 32 estimates the number of MBs covered by the dominant object in the previous frame, and sets the mode decision threshold to equal the estimate, or the estimate plus a difference value. In particular, the intensity information is used to identify MBs sharing a substantially common range of intensities, which is indicative of a contiguous object.

The number of contiguous Intra MBs in the current frame may be compared to the mode decision threshold to determine whether interpolation of the skipped frame should be enabled or disabled. If the Intra MB count in the current frame exceeds this mode decision threshold, i.e., the estimated number of MBs covered by the dominant object in the previous frame, it is likely that the object has moved substantially or new objects have been introduced. In this case, FFP module 26 disables FRUC module 28. In this manner, FFP module 26 acts as a control module, disabling FRUC for frames that contain an excessive number of Intra MBs either due to sudden motion or introduction of a new object in the scene.

The two different mode decision threshold techniques described above, i.e., Intra MB count and contiguous object size, may be used alone or in combination with one another to selectively enable and disable interpolation. Likewise, the motion activity threshold technique described above may be used alone or in combination with one or both of the mode decision threshold techniques. For mode decision threshold techniques, the adaptive threshold is a function of a number of MBs identified as Intra-coded in a previous frame. For the motion activity threshold technique, the adaptive threshold is a function of the motion vector information in the previous frame. In each case, the use of an adaptive threshold supports more effective application of frame interpolation and frame repetition to promote both temporal and spatial quality. Additional discussion of the determination and use of the motion activity threshold and mode decision thresholds follows with reference to FIG. 4.

Figure 4:
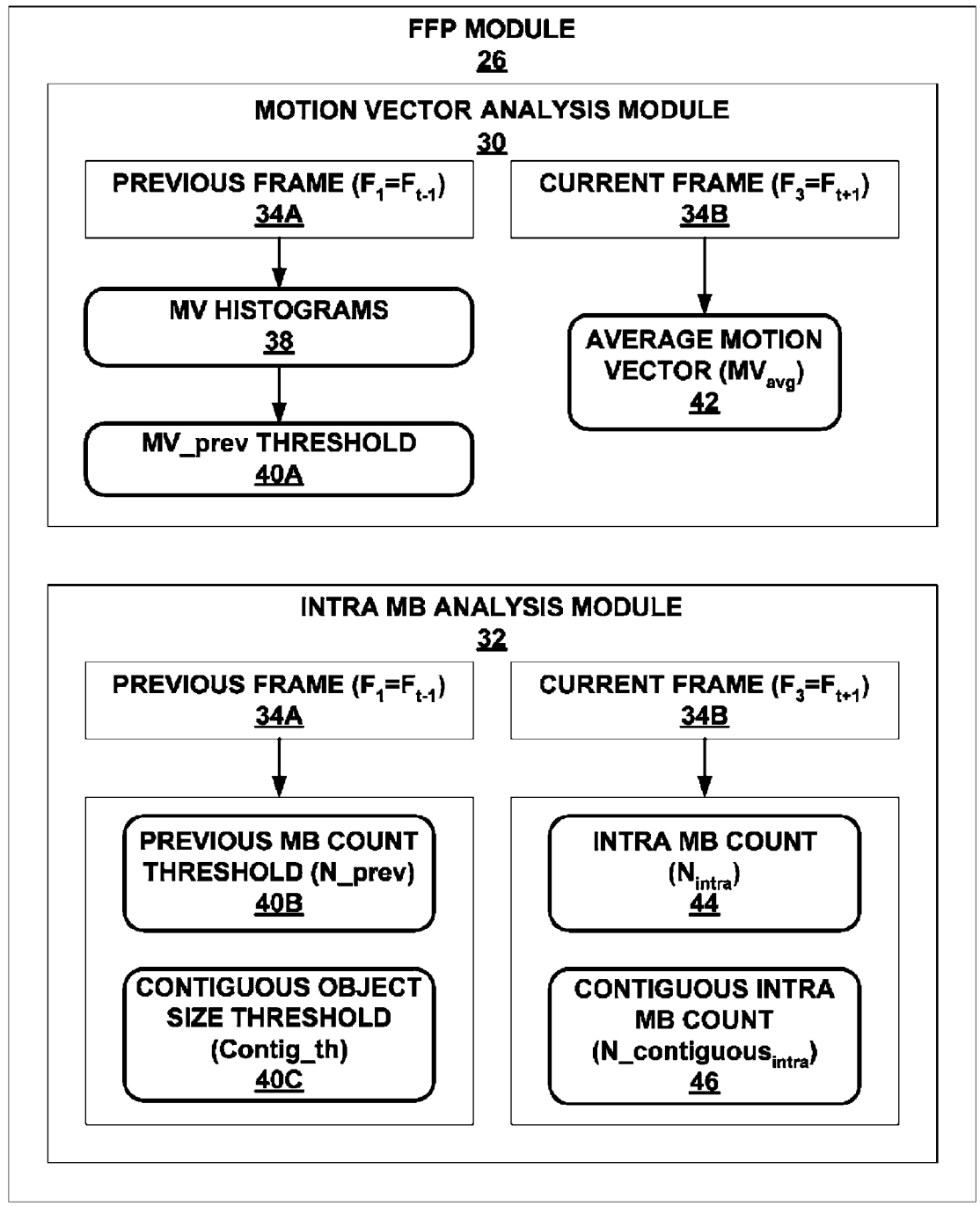
FIG. 4 is a block diagram illustrating a FRUC failure prediction (FFP) module of FIG. 3 in further detail.

FIG. 4 is a block diagram illustrating FFP module 26 of FIG. 2 in further detail. As shown in FIG. 4, motion activity analysis module 30 of FFP module 26 processes a previous frame 34A and a current frame 34B. Intra MB analysis module 32 of FFP module 26 also processes previous frame 34A and current frame 34B. Previous frame 34A and current frame 34B may each comprise the frames respectively denoted $F_1$ and $F_3$ in FIGS. 1 and 2, which were encoded by video encoder 12 and transmitted via transmission channel 15 to video decoder 14. The operations described below may proceed after FFP module 26 receives frame 34A, 34B and may be performed by a processor capable of executing instructions that support these operations.

Upon receiving frames 34A, 34B, motion activity analysis module 30 may analyze previous frame 34A to compute motion vector (MV) histograms 38 ("MV histograms 38"), which are shown in more detail in FIGS. 7B and 7D below. In particular, motion activity analysis module 30 determines MV histograms 38 by analyzing each MB within previous frame 34A and compiling the respective MVs to produce the MV histograms. From MV histograms 38, motion activity analysis module 30 adaptively determines a motion vector (MV) threshold 40A ("MV_prev threshold 40A") in one of a variety of ways.

In some embodiments, motion activity analysis module 30 determines the mean or average motion vector from the MV histograms 38 and sets MV_prev threshold 40A to this mean or average motion vector, plus a difference value. In other embodiments, motion activity analysis module 30 employs more advanced strategies using sliding MB windows for calculating MV histograms 38, whereupon it sets MV_prev threshold 40A according to the value calculated using these advanced strategies. In each case, the value MV_prev threshold 40A is adaptive to each new "previous" frame as the video sequence is processed.

After adaptively determining MV_prev threshold 40A, motion activity analysis module 30 analyzes current frame 34B to determine an average motion vector ($MV_{avg}$) 42, assuming that MV_prev is set to the mean or average motion vector. In particular, motion activity analysis module 30 determines $MV_{avg}$ 42 from information carried by current frame 34B indicating MVs for the MBs of current frame 34B. Motion activity analysis module 30 compares $MV_{avg}$ 42 to MV_prev threshold 40A.

If $MV_{avg}$ 42 is above MV_prev threshold 40A, it could be due to significant change in the motion activity of current frame 34B relative to previous frame 34A. Hence, interpolating between previous frame 34A and current frame 34B could lead to undesirable spatial artifacts, and the optimal strategy would be frame repetition rather than FRUC. In this case, motion activity analysis module 30 indicates to FFP module 26 that FRUC module 28 should not perform conventional FRUC techniques to interpolate or extrapolate the skipped frame, but instead repeat previous frame 34A.

Also, upon receiving frames 34A, 34B, intra MB analysis module 32 may analyze previous frame 34A to determine a previous Intra MB count threshold (N_prev) 40B. In particular, intra MB analysis module 32 may generate an Intra MB count threshold for the previous frame based on the number of MBs with a number of coding bits above one standard deviation from a mean for all MBs in that frame. Previous MB count threshold 40B, therefore, provides an indication of the estimated number of Intra-coded MBs in the previous frame, which correlates to the degree of motion activity in the previous frame. The previous MV count threshold (N_prev) may be equal to the number of MBs with bits above one standard deviation from a mean for the previous frame, or equal to that number plus a difference value.

After adaptively determining previous MB count threshold 40B, intra MB analysis module 32 analyzes current frame 34B to determine intra MB count ($N_{intra}$) 44, i.e., the number of intra-coded MBs in the current frame. In particular, intra MB analysis module 32 may determine intra MB count 44 for the current frame in substantially the manner discussed above in reference to determining previous MB count threshold 40B for the previous frame. Next, intra MB analysis module 32 compares previous intra MB count threshold 40B for the previous frame to intra MB count 44 for the current frame. If the number of intra MBs in the current frame, i.e., intra MB count 44, exceeds the previous MB count threshold N_prev 40B, there has been significant change from previous frame 34A to current frame 34B. In this case, intra MB analysis module 32 disables FRUC module 28 so that it does not interpolate the skipped frame. Instead, decoder 14 repeats the previous frame 34A in place of the skipped frame.

In conjunction with intra MB count technique, or as an alternative, intra MB analysis module 32 may generate a mode decision threshold based on an estimate of contiguous object size threshold (Contig_th) 40C within the previous frame and the current frame. In particular, intra MB analysis module 32 may analyze the MB information of previous frame 34A such that it determines the approximate size of an object existing within previous frame 34A expressed as a number of contiguous MBs. To determine contiguous object size threshold 40C, intra MB analysis module 32 may rely on pixel intensity, e.g., luminance (Y) value, of information present within the MB information.

In an exemplary embodiment, intra MB analysis module 32 estimates the size of the largest contiguous object by defining several vertical and horizontal cross-sections of previous frame 34A and analyzing pixel intensity profiles along these cross-sections. Based on intensity, intra MB analysis module 32 estimates an approximate size along one dimension of any object through which the cross-section passes. Next, intra MB analysis module 32 combines the cross-section information from the X and Y dimension cross-sections and identifies a maximum among the obtained object sizes. Intra MB analysis module 32 estimates the number of MBs covered by a contiguous object defined by the maximum object sizes and sets contiguous object size threshold 40C to either this number or to a sum of this number plus a difference value.

In some embodiments, intra MB analysis module 32 may utilize a spatially sub-sampled version of previous frame 34A so as to reduce computational complexity while considering the intensity profile. In other embodiments, intra MB analysis module 32 may not consider the intensity profile, but instead consider the DC values of the MBs defined within previous frame 34A, which are readily available in the bitstream. In such embodiments, intra MB analysis module 32 may estimate contiguous object size threshold 40C by finding sharp variations in the DC value profile.

Once contiguous object size threshold 40C has been determined, intra MB analysis module 32 analyzes current frame 34B to determine contiguous intra MB count (N_contiguous$_{intra}$) 46. Intra MB analysis module 32 may determine contiguous intra MB count 46 for current frame 34B in a manner substantially similar to that described above in reference to determining contiguous object size threshold 40C. Next, intra MB analysis module 32 compares contiguous object size threshold 40C to contiguous intra MB count 46. If the number of intra MBs in the current frame, i.e., contiguous intra MB count 46, exceeds the contiguous object size threshold 40C, there has been significant change from previous frame 34A to current frame 34B. For example, the object may have moved, rotated, retreated, advanced, or turned between the previous frame and the current frame. In this case, intra MB analysis module 32 disables FRUC module 28 so that it does not interpolate the skipped frame. Instead, decoder 14 repeats the previous frame 34A in place of the skipped frame.

Figure 5:
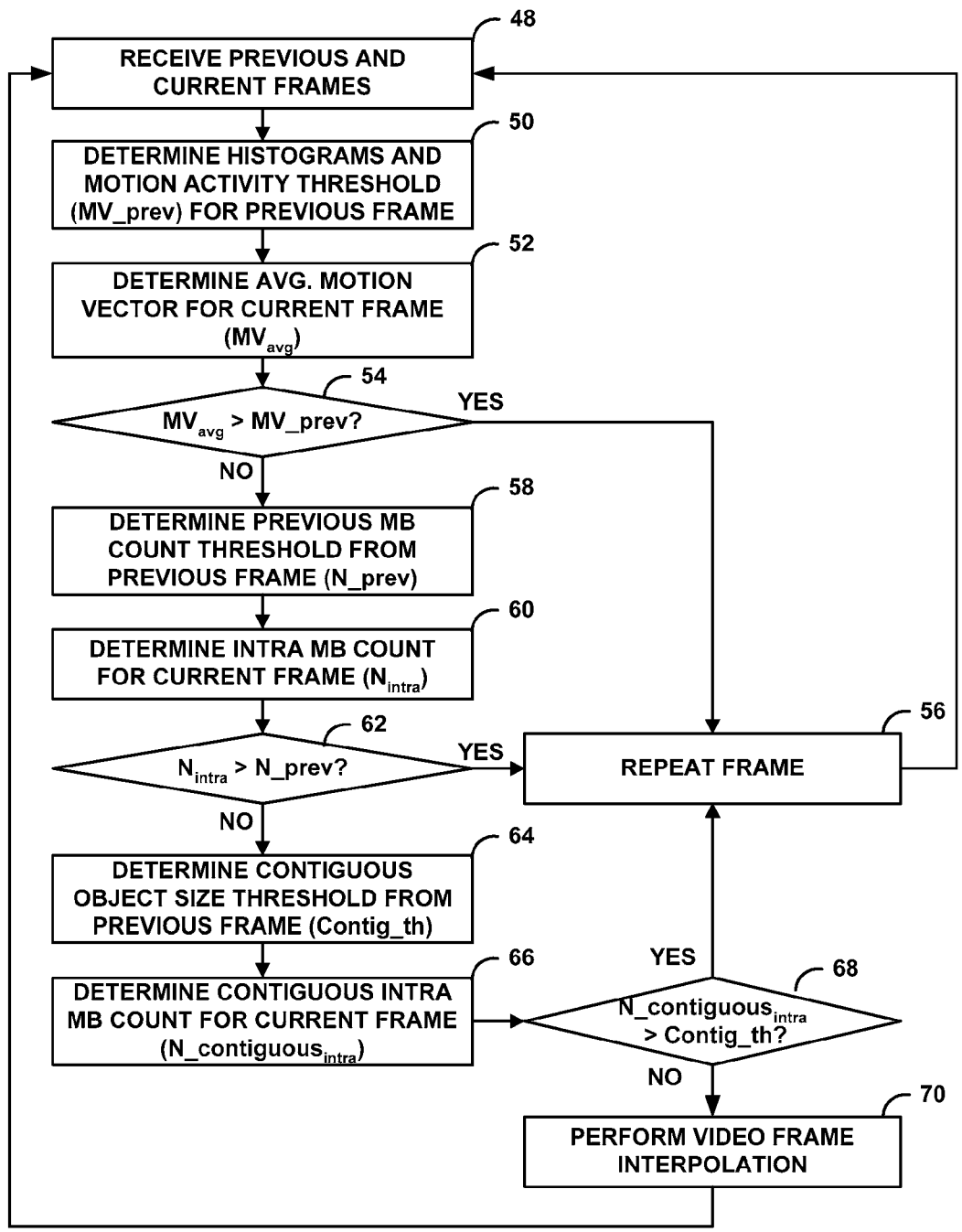
FIG. 5 is a flowchart illustrating an exemplary technique in which a video decoder adaptively determines whether to enable or disable FRUC.

FIG. 5 is a flowchart illustrating an exemplary technique whereby a video decoder, such as video decoder 14 of FIG. 3, adaptively determines whether to employ FRUC techniques to interpolate skipped frames. In the example of FIG. 4, FFP module 26 of video decoder 14 adaptively determines three different thresholds, as described above, and applies the thresholds in a cascaded configuration. For example, FFP module 26 may apply a motion activity threshold, a first mode decision threshold based on Intra MB count, and a second mode decision threshold based on contiguous object size. In FIG. 5, the thresholds are "cascaded" in the sense that FFP module 26, in order to enable interpolation by FRUC module 28, verifies that a current frame does not exceed any of the three applicable thresholds. Although described below in reference to FIG. 4, the techniques may apply to any video decoder capable of applying FRUC by interpolating or extrapolating skipped frames and should not be limited to the illustrated embodiment of FIG. 4.

Initially, FFP module 26 receives both previous frame 34A and current frame 34B via transmission channel 15 (48). Upon receiving frames 34A, 34B, motion activity analysis module 30 determines MV histograms 38 for the previous frame, and based on MV histograms 38, adaptively determines the motion activity threshold MV_prev threshold 40A, as described above (50). Next, motion activity analysis module 30 analyzes current frame 34B to determine the average motion vector ($MV_{avg}$) 42 (52) among the MBs in the current frame. Once both threshold 40A and average motion vector 42 are determined, motion activity analysis module 30 compares MV_prev threshold 40A to average motion vector ($MV_{avg}$) 42 (54). If $MV_{avg}$ 42 exceeds MV_prev threshold 40A, FFP module 26 indicates to FRUC module 28 that it should repeat previous frame 34A instead of interpolating the skipped frame (56). If, however, $MV_{avg}$ 42 does not exceed MV_prev threshold 40A, motion activity analysis module 30 makes no indication to FRUC module 28 and passes control to intra MB analysis module 32.

Intra MB analysis module 32 also receives previous frame 34A and current frame 34B. As described above, intra MB analysis module 32 may adaptively determine previous MB count threshold (N_prev) 40B based on an Intra MB count for previous frame 34A and determines intra MB count ($N_{intra}$) 44 for current frame 34B (58, 60). Next, intra MB analysis module 32 compares $N_{intra}$ 44 to N_prev threshold 40B (62). If $N_{intra}$ 44 exceeds N_prev threshold 40B, intra MB analysis module 32 indicates to FRUC module 28 that it should repeat previous frame 34A instead of interpolating the skipped frame (56).

However, if $N_{intra}$ 44 does not exceed N_prev threshold 40B, intra MB analysis module 32 adaptively determines a third threshold, i.e., contiguous object size threshold (Contig_th) 40C, as described above (64). Intra MB analysis module 32 also determines contiguous intra MB count (N_contiguous$_{intra}$) 46 for current frame 34B in the manner described above (66). After determining both, intra MB analysis module 32 compares N_contiguous$_{intra}$ 46 to Contig_th threshold 40C (68). If N_contiguous$_{intra}$ 46 exceeds Contig_th threshold 40C, intra MB analysis module 32 indicates to FRUC module 28 that it should repeat previous frame 34A. If N_contiguous$_{intra}$ 46 does not exceed Contig_th threshold 40C, intra MB analysis module 32 indicates to FRUC module 28 that it should perform FRUC (70), e.g., by interpolation of the skipped frame.

Hence, FFP module 26 provides a FRUC or frame repetition decision for FRUC module 28. If repetition is advisable, due to excessive motion or content change, FFP module 26 disables FRUC module 28 for a particular skipped frame. FFP module 26 then receives the next pair of previous and current frames, and makes another FRUC or repetition decision. The process proceeds on a continuous basis through the end of the video sequence, addressing the motion activity threshold and/or mode decision threshold for each of the skipped frames. In the cascaded approach shown in FIG. 5, FFP module 26 adaptively determines and applies the three different thresholds 40A-40C. In other embodiments, FFP module 26 may apply only one or two of the thresholds to support the interpolation decision.

Figure 6:
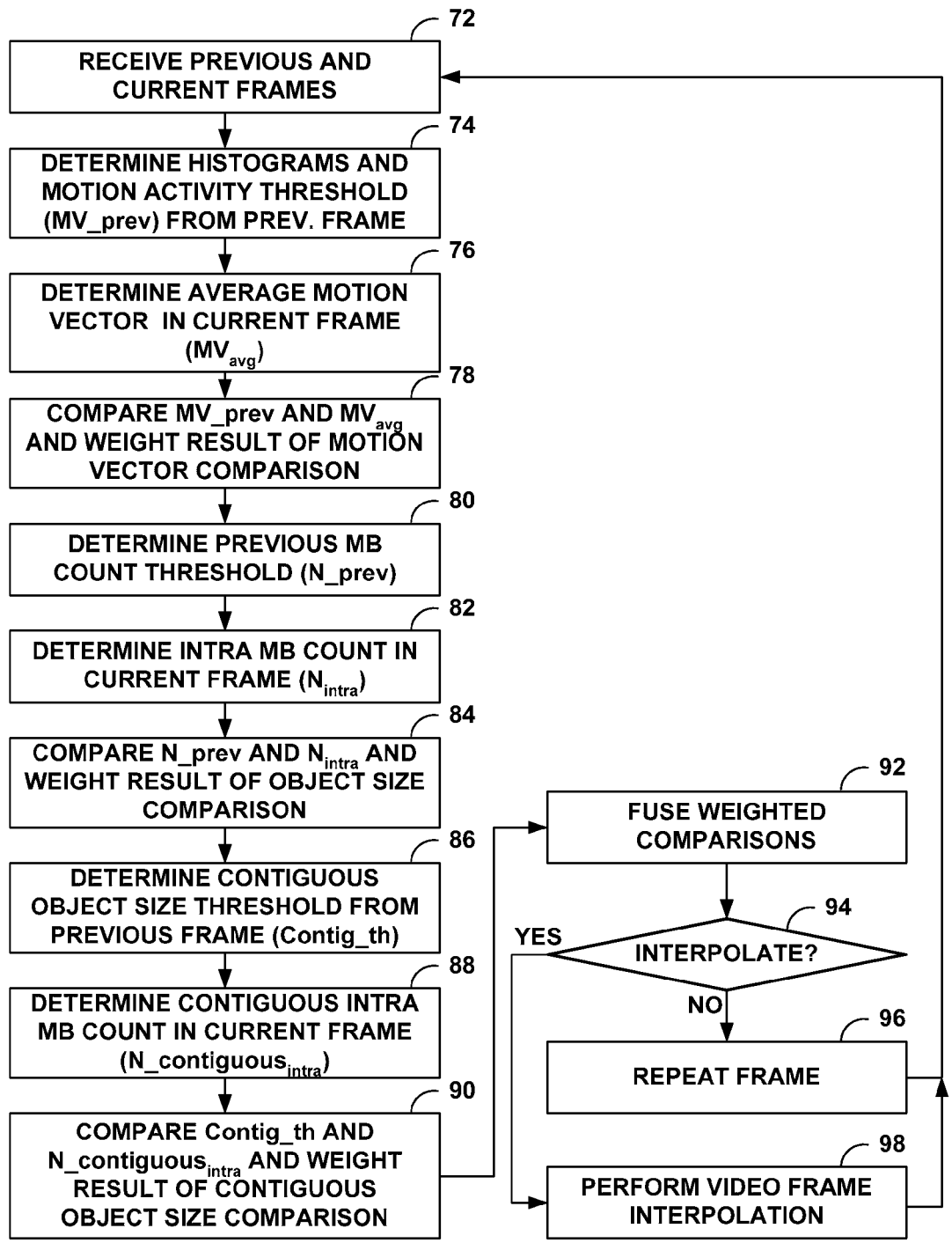
FIG. 6 is a flowchart illustrating another exemplary technique in which a video decoder adaptively determines whether to enable or disable FRUC.

FIG. 6 is a flowchart illustrating another exemplary technique in which video decoder, such as video decoder 14 of FIG. 2, adaptively determines whether to enable or disable FRUC. In the example of FIG. 6, FFP module 26 of video decoder 14 adaptively determines the three different thresholds described above, i.e., a motion activity threshold, an Intra-MB count-based mode decision threshold, and a contiguous object size-based mode decision threshold, and applies these thresholds in a weighted configuration. The process shown in FIG. 6 is "weighted" in the sense that FFP module 26 adaptively determines thresholds 40A-40C shown in FIG. 4, compares thresholds 40A-40C to information obtained from current frame 34B, for example, and weights each of the comparisons to determine whether or not to interpolate the skipped frame.

Weighted analysis of the threshold comparisons yields a decision fusion. The weight of each comparison may be adjusted so as to prioritize the threshold comparisons relative to one another, and thereby tailor the adaptive interpolation technique. In some embodiments, the weights may be manually or automatically adjusted during operation of video decoder 14. In other embodiments, the weights may be statically set, e.g., at the factory. Although described below in reference to FIG. 4, the techniques may apply to any video decoder capable of interpolating skipped frames and should not be limited to the illustrated embodiment of FIG. 4.

Initially, FFP module 26 receives both previous frame 34A and current frame 34B via transmission channel 15 (72). Upon receiving frames 34A, 34B, motion activity analysis module 30 determines MV histograms 38, and based on MV histograms 38, adaptively determines MV_prev threshold 40A from previous frame 34A, as described above (74). Next, motion activity analysis module 30 analyzes current frame 34B to determine average motion vector ($MV_{avg}$) 42 (76). Once both threshold 40A and average motion vector 42 are determined, motion activity analysis module 30 compares MV_prev threshold 40A to average motion vector ($MV_{avg}$) 42 and weights the result of the comparison (78), producing a weighted difference value.

Next, intra MB analysis module 32 adaptively determines previous MB count threshold (N_prev) 40B for previous frame 34A and determines intra MB count ($N_{intra}$) 44 for current frame 34B, as described above (80, 82). Following these determinations, intra MB analysis module 32 compares $N_{intra}$ 44 to N_prev threshold 40B and weights the difference result of the comparison (84). Intra MB analysis module 32 further adaptively determines a third threshold, i.e., contiguous object size threshold (Contig_th) 40C from previous frame 34A, as described above (86). Intra MB analysis module 32 also determines contiguous intra MB count (N_contiguous$_{intra}$) 46 for current frame 34B in the manner described above (88). After determining both, intra MB analysis module 32 compares N_contiguous$_{intra}$ 46 to Contig_th threshold 40C and weights the difference result of the comparison (90).

Upon making the above described three comparisons and weighting each comparison, FFP module 26 fuses the weighted comparisons by performing, for example, one or more mathematical operations (92). For example, the weighted difference results may be simply summed and compared to a composite threshold. If the sum of the weighted differences exceeds the composite threshold, FFP module 26 disables interpolation by FRUC module 28, resulting in repetition of the previous frame (96). If the sum of the weighted different results does not exceed the composite threshold, FFP module 26 enables FRUC module 28 (98). The fusion of the weighted comparisons may be subject to a wide variety of mathematical operations, such as normalization and scaling.

Figure 7A:
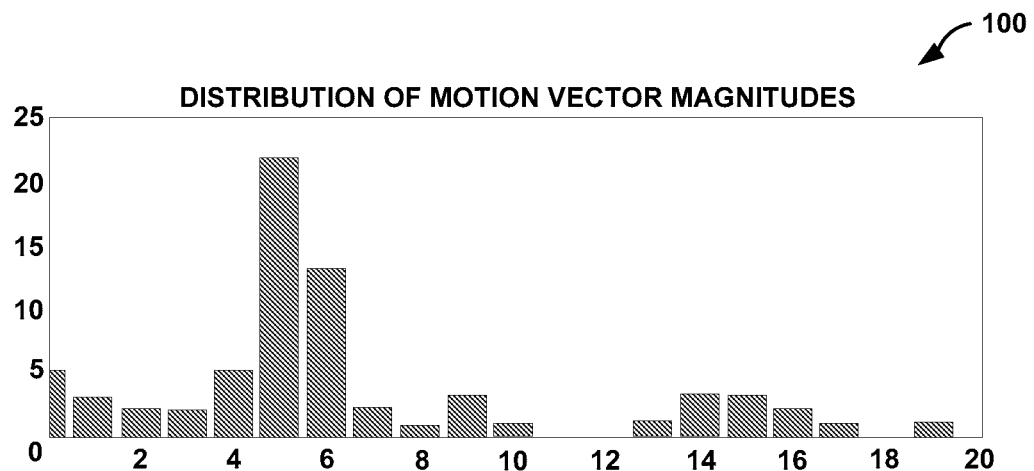
FIGS. 7A-7D are graphs illustrating exemplary distributions of macro blocks (MBs) of a previous frame and associated motion vector (MV) histograms.
Figure 7B:
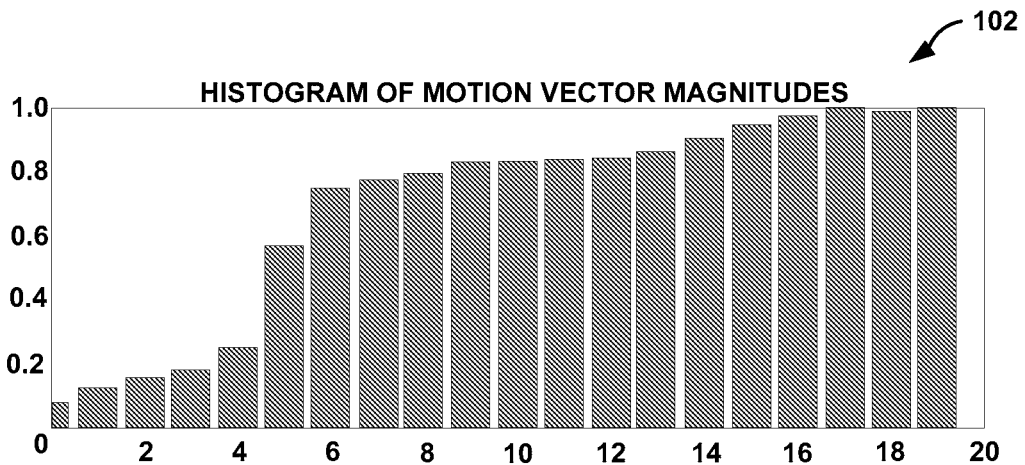
Figure 7C:
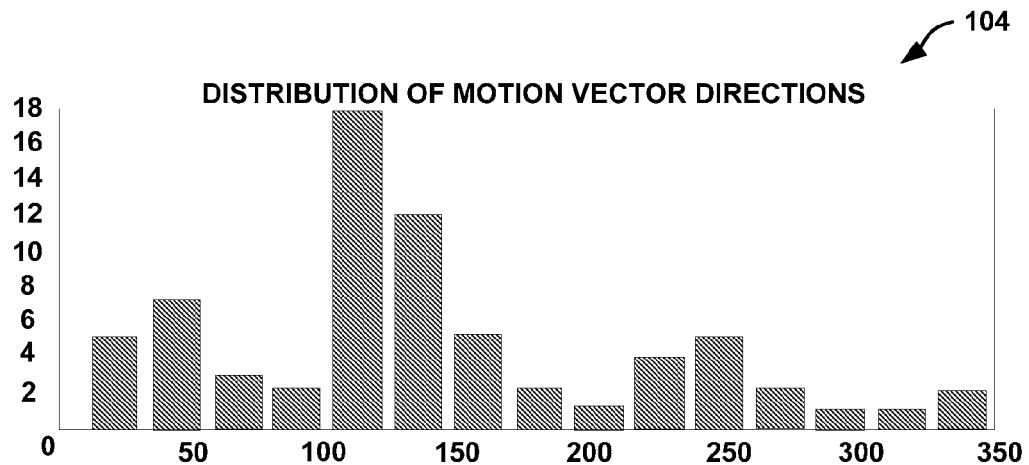
Figure 7D:
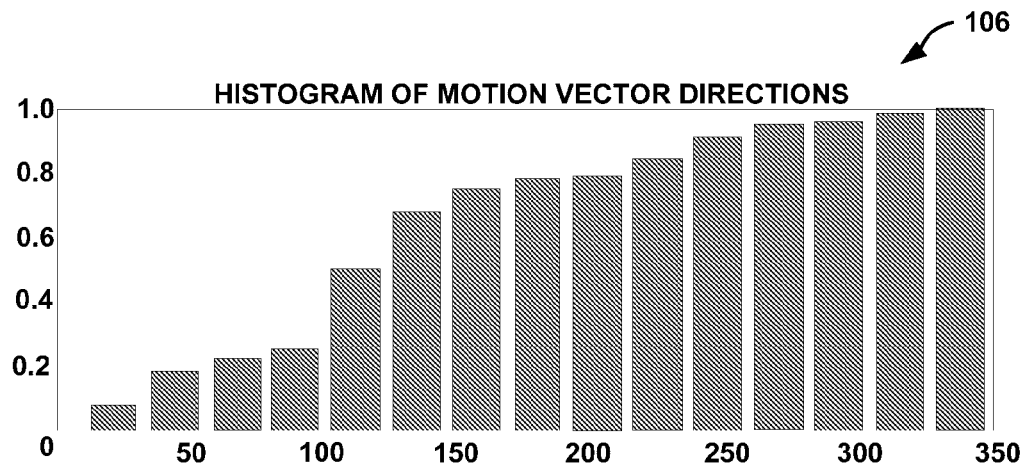

FIGS. 7A-7D are graphs illustrating exemplary distributions of macro blocks (MBs) of a previous frame, such as previous frame 34A of FIG. 4, and their associated MV histograms, which may be substantially similar to MV histograms 38. FIG. 7A shows a graph 100 that illustrates the histogram distribution of motion vector magnitudes. FIG. 7B shows a graph 102 that illustrates a normalized histogram of motion vector magnitudes. FIG. 7C shows a graph 104 that illustrates a distribution of motion vector directions. FIG. 7D shows a graph 106 that illustrates a histogram of motion vector directions.

Graphs 100-106 illustrate information that may be used in the selective FRUC techniques described herein. Referring to FIG. 7A, the x-axis of graph 100 indicates the motion vector magnitude, and the y-axis of graph 100 indicates the number of MBs having each motion vector magnitude. Thus, the gray bars indicate the number of MBs having the particular motion vector magnitude defined by the x-axis.

Referring to FIG. 7B, the x-axis of graph 102 indicates the motion vector magnitude, and the y-axis of graph 102 indicates the probability that a MB has a motion vector magnitude less than or equal to a given value along the y-axis. Thus, the gray bars indicate the likelihood that a MB will have a motion vector less than or equal to the magnitude indicated by the x-axis. For example, the last gray bar on the right indicates that there is a 100% (or 1.0) likelihood that a MB will have a magnitude less than or equal to 19.

Using the data shown in graph 100 or 102, motion activity analysis module 30 may determine a mean motion vector magnitude for the previous frame. In the illustrated histogram graph 102, motion activity analysis module 30 determines a mean motion vector magnitude of approximately 6.8. Referring to FIG. 7C, the x-axis of graph 104 indicates the motion vector direction in degrees, and the y-axis of graph 104 indicates the number of MBs. having each motion direction Thus, the gray bars indicate the number of MBs having the particular motion vector direction defined by the x-axis. Graph 104 is based on the MB information of previous frame 34A. Graph 104 arranges the MBs by direction, and counts the number of MBs for each directional range of 25 rotational degrees.

Referring to FIG. 7D, the x-axis of graph 106 indicates the motion vector direction in degrees, and the y-axis of graph 106 indicates the probability that a MB has a motion vector direction less than or equal to a given value along the y-axis. Thus, the gray bars indicate the likelihood that a MB will have a motion vector of a direction less than or equal to the direction indicated by the x-axis. For example, the last gray bar on the right indicates that there is a 100% (or 1.0) likelihood that a MB will have a direction less than or equal to 350 degrees. Using the information in histogram graph 106, motion activity analysis module 30 may determine a mean motion vector direction for the previous frame. The illustrated histogram graph 106 shows a mean motion vector direction of 138.50.

Using the resulting averages determined from histogram graphs 102, 106, motion activity analysis module 30 determines a mean motion vector, as a vector requires both magnitude and direction. Motion activity analysis module 30 sets MV_prev threshold 40A to a vector value based on the mean magnitude and mean direction derived from histogram graphs 102, 106, respectively. In this manner, motion activity analysis module 30 adaptively determines MV_prev threshold 40A from data in MV histograms 38, which may be substantially similar to histogram graphs 102, 106.

As an example, motion activity analysis module 30 may compare vector component magnitudes in the X (horizontal) direction, Y (vertical) direction, or both, as mentioned previously. Alternatively, motion activity analysis module 30 may compare vector magnitude and angle to respective thresholds. In each case, the motion activity analysis module 30 may rely on both magnitude and direction to identify excessive motion or scene change.

Although shown as graphs 100-106 for ease of illustration, motion activity analysis module 30 need not actually construct histogram graphs 102, 106 in graph form. Instead, motion activity analysis module 30 may, in some embodiments, store a table, linked list, tree, or any other type of data structure that contains information similar to that represented by graphs 102, 106. Analysis of these data structures may similarly yield a mean motion vector to which it may perform comparisons, as described above.

Figure 8A:
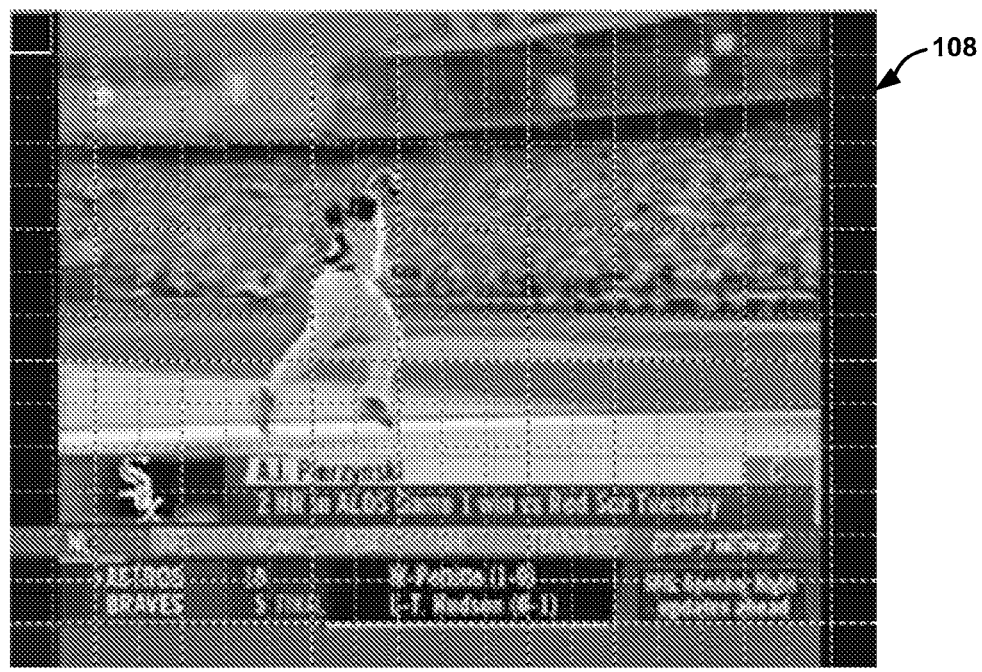
FIG. 8A illustrates a video frame divided into macroblocks (MBs).
Figure 8B:
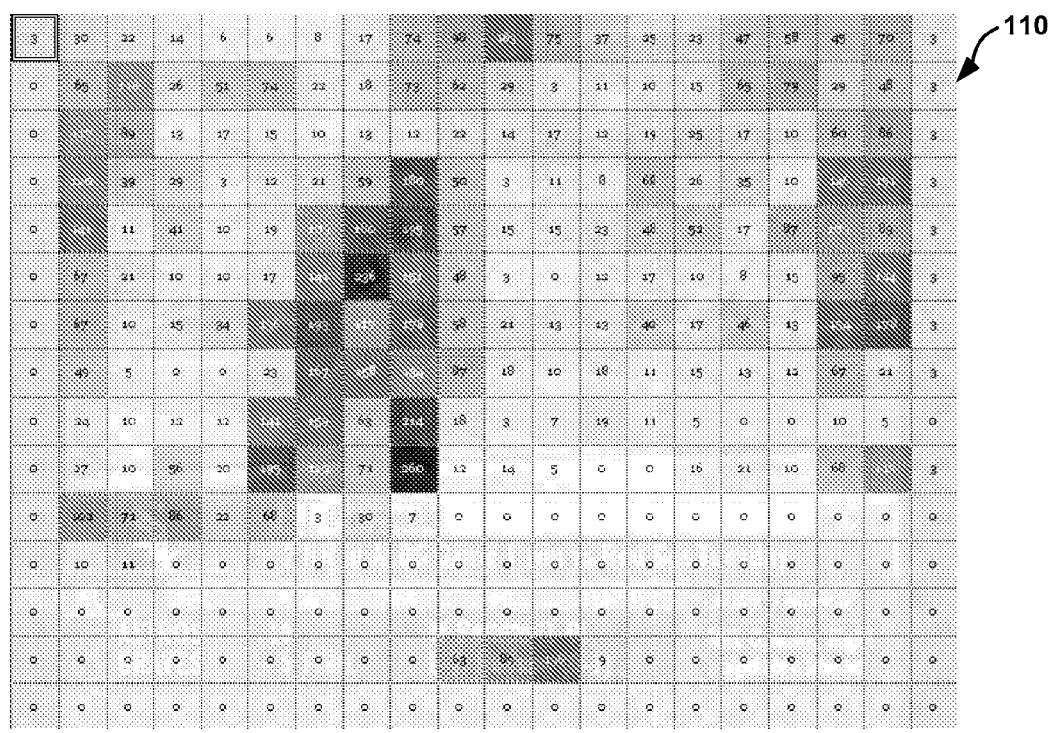
FIG. 8B is a map indicating a number of coding bits allocated to each of the MBs in the video frame of FIG. 8A for use in analysis of motion activity.

FIGS. 8A and 8B illustrate an exemplary previous frame 108 formed by MBs and an analyzed previous frame 110 indicating MB bits for the MBs of frame 108. Intra MB analysis module 32 receives previous frame 108, which may be substantially similar in form to previous frame 34A, and performs an analysis upon previous frame 108 to generate analyzed previous frame 110. The individual gray-scaled tiles of analyzed previous frame 110 represent MBs, and include numbers specifying the number of coding bits allocated to the respective MBs. The lighter gray-scaled tiles indicate MBs to which a smaller number of coding bits have been allocated, indicating lower motion. The darker gray-scaled tiles indicate MBs to which a larger number of coding bits have been allocated, indicating higher motion or scene change. Intra MB analysis module 32 first determines a mean number of coding bits for each MB, e.g., by dividing the total number of coding bits by the number of MBs.

After calculating the mean bit value, intra MB analysis module 32 identifies those MBs having a number of coding bits that are one standard deviation above the mean value and adjusts the previous MB count threshold (N_prev) 40B based on this number. The identified MBs are considered to be Intra coded MBs due to the relatively higher number of coding bits allocated to the MBs. N_prev may be a sum of the number of MBs in the previous frame having a number of coding bits one standard deviation above the mean intensity value and a difference value. Intra MB analysis module 32 may perform a similar operation to calculate intra MB count (N_intra) 44 for current frame 34B.

Upon calculating both N_prev and N_intra via this operation, intra MB analysis module 32 compares the values to determine whether interpolation of a skipped frame by FRUC module 28 should be enabled or disabled. If the number of intra-coded MBs N_intra in the current frame is greater than the threshold N_prev for the previous frame, FFP module 26 disables interpolation of the skipped frame by FRUC module 28. Instead, decoder 14 repeats the previous frame in place of the skipped frame. Alternatively, if the number of intra-coded MBs N_intra in the current frame is less than or equal to the threshold N_prev for the previous frame, FFP module 26 enables FRUC.

Although graphically represented via FIGS. 8A and 8B for ease of illustration, the adaptive interpolation technique implemented in decoder 14 need not perform any such operation in a graphical manner, but may instead perform these operations and store the results in a table, linked list, tree or any other data structure for use in performing the comparison. Accordingly, the graphical representation in FIGS. 8A and 8B is merely for illustrative purposes.

Figure 9:
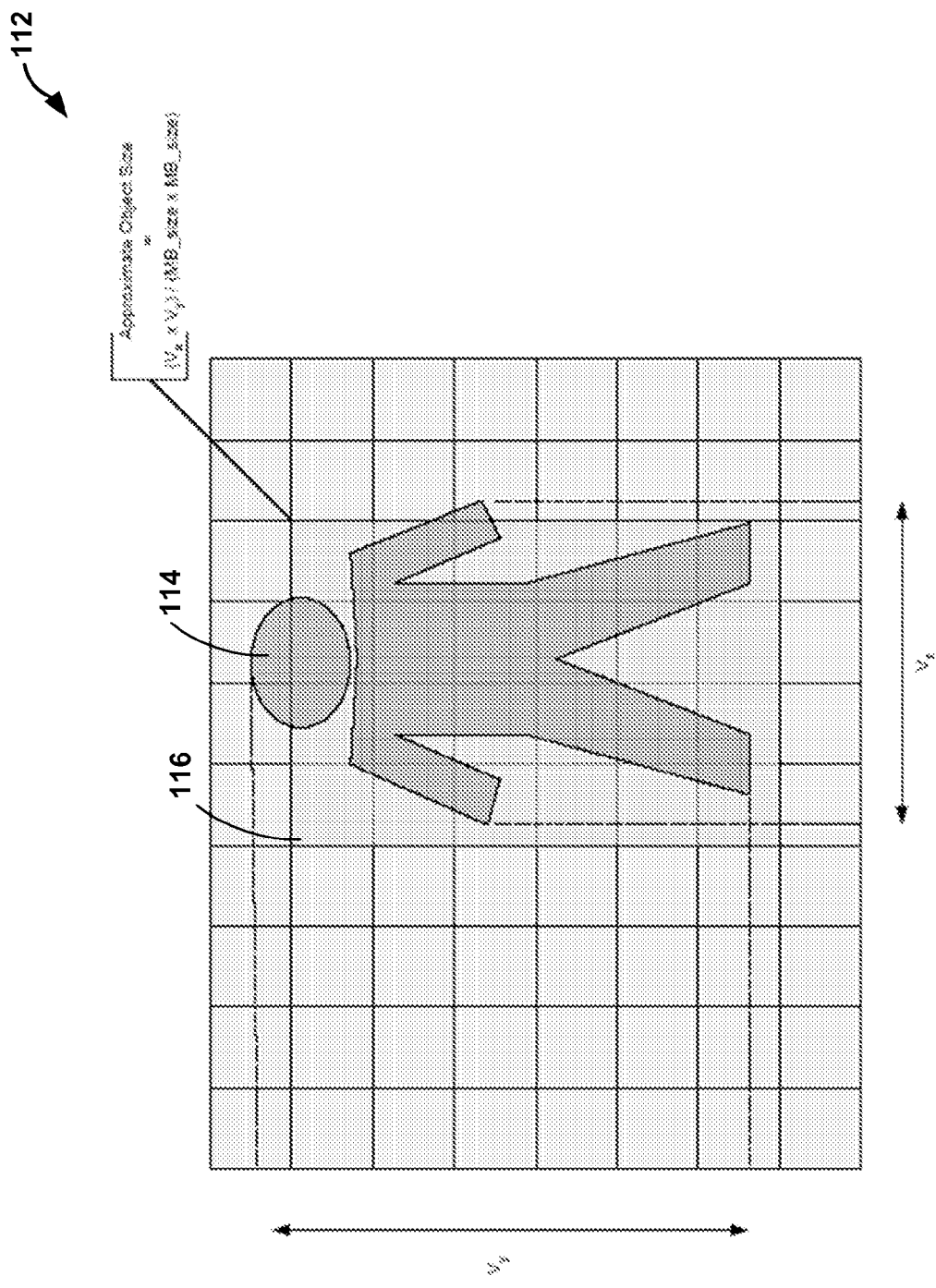
FIG. 9 is a map illustrating determination of an approximate contiguous object size in a video frame for use in analysis of motion activity.

FIG. 9 illustrates an exemplary previous frame 112 that intra MB analysis module 32 of FIG. 4 may analyze in order to determine contiguous object size threshold (Contig_th) 40C. Previous frame 112 may be substantially similar to previous frame 34B. Intra MB analysis module 32 analyzes previous frame 112 in the above described manner, i.e., by calculating intensity cross sections for various objects and identifying the largest object via the intensity cross sections. After analyzing previous frame 112, intra MB analysis module 32 determines contiguous object size threshold 40C by estimating the number of MBs the largest object occupies.

In previous frame 112, for example, intra MB analysis module 32 identifies an object 114 as the largest object via the cross section intensity analysis. Next, intra MB analysis module 32 determines contiguous object size threshold 40C by counting the number of MBs forming approximate object size

116. Intra MB analysis module 32 may calculate approximate object size 116 according to the following equation (which is also shown in FIG. 9):

$$\text{Approximate object size} = (V_y * V_x) / (MB\_size_y * MB\_size_x)$$

where $V_y$ and $V_x$ represent the largest continuous respective y-axis and x-axis intensity cross sections, respectively, for object 114. $MB\_size_y$ and $MB\_size_x$ represent the macro block (MB) dimensions along the y-axis and x-axis, respectively. Using this equation, intra MB analysis module 32 may determine approximate object size 116 and therefore contiguous object size threshold 40C.

A comparison of a contiguous intra MBs in the previous frame and the current frame serves as the basis for the interpolation decision by FFP module 26. If the estimated MB count for the largest contiguous object in the current frame exceeds a mode decision threshold calculated based on the MB count for the largest contiguous object in the previous frame, it is likely that the object has moved substantially. In this case, FFP module 26 disables interpolation by FRUC module 28. In this manner, FFP module 26 disables interpolation for frames that contain an excessive amount of motion or new content.

Adaptive determination of motion activity or mode decision thresholds may enable video decoder 14 to provide a more robust and adaptive way of pre-screening frames for interpolation of skipped frames. With adaptive interpolation, video decoder 14 can minimize spatial artifacts seen by the viewer. In addition, decoder 14 may reduce computational overhead and power consumption by avoiding interpolation of some frames. An adaptive technique also may not be difficult to implement as most of the information needed for making a decision to repeat or interpolate a given frame are available at the bitstream level.

The techniques described in this disclosure may be implemented in hardware, software, firmware or any combination thereof. In particular, a decoder, as described herein, may be realized by any of a variety of hardware, software and firmware components. The term module, unit, or similar terminology, likewise may refer to a hardware module, software module, firmware module, or combination thereof.

Various aspects of the techniques may be implemented within one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. In some embodiments, the functionality described herein may be provided within dedicated software modules or hardware units configured for encoding and decoding, or incorporated in a combined video encoder-decoder (CODEC).

When implemented in software, the techniques may be realized in part by a computer readable medium comprising program code or instructions that, when executed by a processor, performs one or more of the functions described above. A computer-readable medium storing such program code or instructions may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, or any combination of such memory or storage media.

Various embodiments of the invention have been described. These and other embodiments are within the scope of the following claims.

The invention claimed is:

1. A method comprising:
   selectively enabling and disabling video frame rate upconversion in a video decoder based on motion activity criteria and mode decision criteria;
   adapting the motion activity criteria based on one or more characteristics of at least one previous video frame in proximity to a skipped frame; and
   adapting the mode decision criteria based on the one or more characteristics of the at least one previous frame in proximity to the skipped frame.

2. The method of claim 1,
   wherein the motion activity criteria include a motion activity threshold, the method further comprising selectively disabling frame rate upconversion when a motion activity value for a current frame exceeds the motion activity threshold.

3. The method of claim 2,
   wherein the motion activity value includes an average motion vector value for the current frame, and
   wherein the motion activity threshold is derived from a histogram of motion vector values for the at least one previous frame.

4. The method of claim 3, wherein adapting the motion activity criteria includes adjusting the motion activity threshold based on the motion vector values for the at least one previous frame.

5. The method of claim 1,
   wherein the mode decision criteria includes a mode decision threshold, the method further comprising selectively disabling frame rate upconversion when a number of intra-coded macroblocks in a current frame exceeds the mode decision threshold.

6. The method of claim 5, further comprising determining the mode decision threshold based on a number of macroblocks having a number of coding bits above a threshold.

7. The method of claim 5, further comprising determining the mode decision threshold based on an approximate size of a contiguous object in the at least one previous frame.

8. The method of claim 1, further comprising repeating the at least one previous frame in place of the skipped frame when the frame rate upconversion module is disabled.

9. The method of claim 1,
   wherein the motion activity criteria includes a motion activity threshold,
   wherein the mode decision criteria includes a mode decision threshold specifying a macroblock count, and
   wherein the method further comprises selectively disabling frame rate upconversion when a motion activity value for a current frame exceeds the motion activity threshold or when a number of intra-coded macroblocks in the current frame exceeds the macroblock count of the mode decision threshold.

10. The method of claim 1,
    wherein the motion activity criteria includes a motion activity threshold,
    wherein the mode decision criteria includes a mode decision threshold specifying a contiguous object size, and
    wherein the method further comprises selectively disabling frame rate upconversion when a motion activity value for a current frame exceeds the motion activity threshold or when a number of contiguous, intra-coded macroblocks in the current frame exceeds the mode decision threshold.

11. The method of claim 1,
wherein the motion activity criteria includes a motion activity threshold,
wherein the mode decision criteria include a macroblock count threshold and a contiguous object size threshold, and
wherein the method further comprises:
comparing the motion activity value for a current frame to the motion activity threshold to produce a first difference value;
comparing a number of intra-coded macroblocks in the current frame to the mode decision threshold to produce a second difference value;
comparing a number of contiguous, intra-coded macroblocks in the current frame to the contiguous object size threshold to produce a third difference value;
weighting the difference values;
summing the weighted difference values; and
selectively disabling frame rate upconversion when the sum of the weighted difference values exceeds a threshold value.

12. The method of claim 1, wherein the motion activity criteria and the mode decision criteria indicate whether the frame rate upconversion is likely to produce a spatial artifact.

13. A video decoder comprising:
a frame rate upconversion module configured to frame rate upcovert a video sequence; and
a controller that selectively enables and disables the frame rate upconversion module based on motion activity criteria and mode decision criteria, adapts the motion activity criteria based on one or more characteristics of at least one previous video frame in proximity to a skipped frame, and adapts the mode decision criteria based on the one or more characteristics of the at least one previous video frame in proximity to the skipped frame.

14. The video decoder of claim 13,
wherein the mode activity criteria include a motion activity threshold, and
wherein the controller selectively disables the frame rate upconversion module when a motion activity value for a current frame exceeds the motion activity threshold.

15. The video decoder of claim 14,
wherein the motion activity value includes an average motion vector value for the current frame, and
wherein the motion activity threshold is derived from a histogram of motion vector values for the at least one previous frame.

16. The video decoder of claim 15, wherein the controller adjusts the motion activity threshold based on the motion vector values for the at least one previous frame to adapt the motion activity criteria.

17. The video decoder of claim 13,
wherein the mode decision criteria includes a mode decision threshold, and
wherein the controller selectively disables the frame rate upconversion module when a number of intra-coded macroblocks in a current frame exceeds the mode decision threshold.

18. The video decoder of claim 17, wherein the controller determines the mode decision threshold based on a number of macroblocks having a number of coding bits above a threshold.

19. The video decoder of claim 17, wherein the controller determines the mode decision threshold based on an approximate size of a contiguous object in the at least one previous frame.

20. The video decoder of claim 13, wherein the decoder repeats the at least one previous frame in place of the skipped frame when the frame rate upconversion module is disabled.

21. The video decoder of claim 13,
wherein the motion activity criteria includes a motion activity threshold,
wherein the mode decision criteria includes a mode decision threshold specifying a macroblock count, and
wherein the controller selectively disables the video frame rate upconversion module when a motion activity value for a current frame exceeds the motion activity threshold or when a number of intra-coded macroblocks in the current frame exceeds the macroblock count of the mode decision threshold.

22. The video decoder of claim 13,
wherein the motion activity criteria includes a motion activity threshold,
wherein the mode decision criteria includes a mode decision threshold specifying a contiguous object size, and
wherein the controller selectively disables the video frame rate upconversion module when a motion activity value for a current frame exceeds the motion activity threshold or when a number of contiguous, intra-coded macroblocks in the current frame exceeds the mode decision threshold.

23. The video decoder of claim 13,
wherein the motion activity criteria includes a motion activity threshold,
wherein the mode decision criteria include a macroblock count threshold and a contiguous object size threshold, and
wherein the controller compares the motion activity value for a current frame to the motion activity threshold to produce a first difference value, compares a number of intra-coded macroblocks in the current frame to the mode decision threshold to produce a second difference value, compares a number of contiguous, intra-coded macroblocks in the current frame to the contiguous object size threshold to produce a third difference value, weights the difference values, sums the weighted difference values, and selectively disables the video frame rate upconversion module when the sum of the weighted difference values exceeds a threshold value.

24. The video decoder of claim 13, wherein the motion activity criteria and the mode decision criteria indicate whether the frame rate upconversion is likely to produce a spatial artifact.

25. The video decoder of claim 24, wherein the motion activity criteria and the mode decision criteria indicate whether the frame rate upconversion is likely to produce a significant spatial artifact.

26. A non-transitory computer-readable medium comprising instructions to cause a processor to:
selectively enable and disable video frame rate upconversion in a video decoder based on motion activity criteria and mode decision criteria;
adapt the motion activity criteria based on one or more characteristics of at least one previous video frame in proximity to a skipped frame; and
adapt the mode decision criteria based on the one or more characteristics of the at least one previous frame in proximity to the skipped frame.

27. The non-transitory computer-readable medium of claim 26,
wherein the motion activity criteria include a motion activity threshold, and wherein the instructions cause the processor to selectively disable video frame rate upconversion when a motion activity value for a current frame exceeds the motion activity threshold.

28. The non-transitory computer-readable medium of claim 27,
wherein the motion activity value includes an average motion vector value for the current frame, and
wherein the motion activity threshold is derived from a histogram of motion vector values for the at least one previous frame.

29. The non-transitory computer-readable medium of claim 28, wherein the instructions cause the processor to adjust the motion activity threshold based on the motion vector values for the at least one previous frame.

30. The non-transitory computer-readable medium of claim 26,
wherein the mode decision criteria includes a mode decision threshold, and
wherein the instructions cause the processor to selectively disable video frame rate upconversion when a number of intra-coded macroblocks in a current frame exceeds the mode decision threshold.

31. The non-transitory computer-readable of claim 30, wherein the instructions cause the processor to determine the mode decision threshold based on a number of macroblocks having a number of coding bits above a threshold.

32. The non-transitory computer-readable of claim 30, wherein the instructions cause the processor to determine the mode decision threshold based on an approximate size of a contiguous object in the at least one previous frame.

33. The non-transitory computer-readable medium of claim 26, wherein the instructions cause the processor to repeat the at least one previous frame in place of the skipped frame when frame rate upconversion is disabled.

34. The non-transitory computer-readable medium of claim 26,
wherein the motion activity criteria includes a motion activity threshold,
wherein the mode decision criteria includes a mode decision threshold specifying a macroblock count, and
wherein the instructions cause the processor to selectively disable video frame rate upconversion when a motion activity value for a current frame exceeds the motion activity threshold or when a number of intra-coded macroblocks in the current frame exceeds the mode decision threshold.

35. The non-transitory computer-readable medium of claim 26,
wherein the motion activity criteria includes a motion activity threshold,
wherein the mode decision criteria includes a mode decision threshold specifying a contiguous object size, and
wherein the instructions cause the processor to selectively disable video frame rate upconversion when a motion activity value for a current frame exceeds the motion activity threshold or when a number of contiguous, intra-coded macroblocks in the current frame exceeds the mode decision threshold.

36. The non-transitory computer-readable medium of claim 26,
wherein the motion activity criteria includes a motion activity threshold,
wherein the mode decision criteria include a macroblock count threshold and a contiguous object size threshold, and
wherein the instructions cause the processor to:
compare the motion activity value for a current frame to the motion activity threshold to produce a first difference value;
compare a number of intra-coded macroblocks in the current frame to the mode decision threshold to produce a second difference value;
compare a number of contiguous, intra-coded macroblocks in the current frame to the contiguous object size threshold to produce a third difference value;
weight the difference values;
sum the weighted difference values; and
selectively disable frame rate upconversion when the sum of the weighted difference values exceeds a threshold value.

37. The non-transitory computer-readable medium of claim 26, wherein the motion activity criteria and the mode decision criteria indicate whether the frame rate upconversion is likely to produce a spatial artifact.

38. A video decoder comprising:
means for selectively enabling and disabling video frame rate upconversion in a video decoder based on motion activity criteria and mode decision criteria;
means for adapting the motion activity criteria based on one or more characteristics of at least one previous video frame in proximity to a skipped frame; and
means for adapting the mode decision criteria based on the one or more characteristics of the at least one previous frame in proximity to the skipped frame.

39. The video decoder of claim 38, wherein the motion activity criteria include a motion activity threshold, the decoder further comprising means for selectively disabling video frame rate upconversion when a motion activity value for a current frame exceeds the motion activity threshold.

40. The video decoder of claim 39, wherein the motion activity value includes an average motion vector value for the current frame, and wherein the motion activity threshold is derived from a histogram of motion vector values for the at least one previous frame.

41. The video decoder of claim 38, wherein the means for adapting the motion activity criteria includes means for adjusting the motion activity threshold based on the motion vector values for the at least one previous frame.

42. The video decoder of claim 38, wherein the mode decision criteria includes a mode decision threshold, the decoder further comprising means for selectively disabling video frame rate upconversion when a number of intra-coded macroblocks in a current frame exceeds the mode decision threshold.

43. The video decoder of claim 42, further comprising means for determining the mode decision threshold based on a number of macroblocks in the at least one previous frame having a number of coding bits above a threshold.

44. The video decoder of claim 42, further comprising means for determining the mode decision threshold based on an approximate size of a contiguous object in the at least one previous frame.

45. The video decoder of claim 38, wherein the mode activity criteria and the mode decision criteria indicate whether the frame rate upconversion is likely to produce a spatial artifact.

* * * * *